D. F. KILGOUR.
SHOCK ABSORBER.
APPLICATION FILED SEPT. 27, 1909.
984,377.
Patented Feb. 14, 1911.
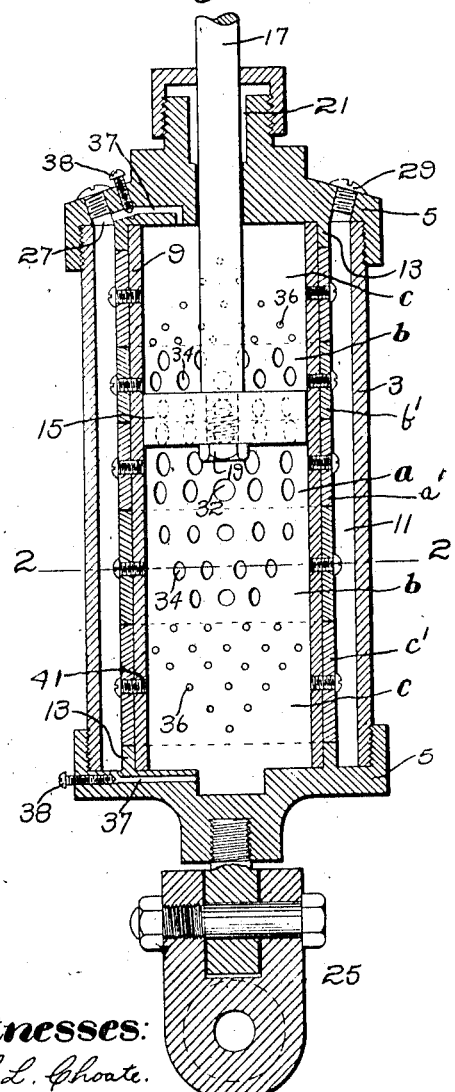
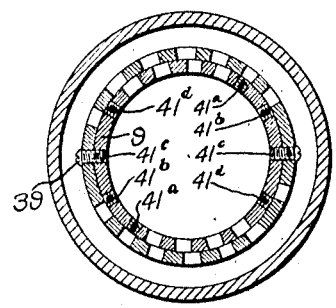
Witnesses:
Carl L. Choate.
Robert H. Kammler.
Inventor:
Dwight F. Kilgour,
by Emery & Booth
Attys.

UNITED STATES PATENT OFFICE.

DWIGHT F. KILGOUR, OF LEXINGTON, MASSACHUSETTS.

SHOCK-ABSORBER.

984,377.  Specification of Letters Patent.  Patented Feb. 14, 1911.

Application filed September 27, 1909. Serial No. 519,682.

*To all whom it may concern:*

Be it known that I, DWIGHT F. KILGOUR, a citizen of the United States, and a resident of Lexington, in the county of Middlesex and Commonwealth of Massachusetts, have invented an Improvement in Shock-Absorbers, of which the following description, in connection with the accompanying drawings, is a specification, like letters on the drawings representing like parts.

This invention relates to shock absorbers for automobiles and other vehicles.

The character of the invention may be best understood by reference to the following description of an illustrative embodiment thereof shown in the accompanying drawings, wherein:

Figure 1 is a vertical section through a shock absorber embodying my invention; and Fig. 2 is a transverse section taken on line 2—2 of Fig. 1.

Referring to the drawings the illustrative shock absorber herein shown as embodying my invention comprises a cylindrical casing 3 having its ends threaded into cylinder heads 5. Within the casing 3 is introduced a hollow cylinder or chamber 9 of somewhat smaller diameter than said casing, an annular chamber 11 being formed between the two. This cylinder is not permanently positioned within said casing, but is removably retained therein by setting the ends of said cylinder within annular flanges 13 projecting from the cylinder heads 5 into said casing.

Within the cylinder 9 is fitted a piston 15, threaded on the reduced end of a piston rod 17 and secured thereto by a nut 19. This rod projects through the upper cylinder head the latter being provided with a suitable stuffing box 21 to prevent leakage from the cylinder around said piston.

To cause the piston to move up and down in said cylinder in response to the movements of the vehicle body or chassis, the upper end of the piston may be connected to a suitable bracket on the chassis or body of the vehicle by a universal joint 23, while the lower cylinder head 5 may be connected to a suitable bracket on the axle or on the under side of the vehicle spring by a universal joint 25.

To impede or resist the movement of the piston within the cylinder or chamber 9, the latter and the annular chamber 11 may be filled with oil or any other fluid as desired. The oil may be introduced into the casing through filling holes 27 which may be closed by screw 29.

To permit the oil or fluid to escape from said cylinder into the annular chamber and circulate from one to the other as the piston reciprocates the wall of said cylinder may be discontinuous, perforated or foraminated. To increase the resistance to the escape of the oil or fluid from said cylinder, in proportion to the piston movement said cylinder is divided into a plurality of zones, each having comparatively small perforations of different areas, five such zones being shown herein, comprising a central zone $a$, zones $b$ above and beneath the latter and zones $c$ adjacent the zones $b$. When the vehicle is passing over smooth roads the vehicle springs do not receive great shocks and the piston reciprocates with slight movements in zone $a$. To provide little or no resistance to the piston under these conditions the zone $a$ is provided with large perforations 32, permitting the oil to readily escape therethrough when pressed by the piston.

When the vehicle is passing over rough roads or obstacles, the piston reciprocations are greater and the piston would pass beyond zone $a$ into zones $b$. This zone is provided with perforations 34 which are smaller than those in zone $a$ and resist the egress of the oil from said cylinder. As a result the movement of the piston is impeded or cushioned.

When unusually rough roads or unusually large obstacles are passed over the piston may pass beyond the zones $b$ into zones $c$. To offer still greater resistance to the piston in the latter zones, the perforations 36 are provided, smaller than those in the zones $b$.

Each zone contains a multiplicity of openings distributed laterally of the cylinder and graded longitudinally of the latter to provide a gradually reduced total area of opening in each zone and also provide a gradually reduced total area of opening extending from the central zone toward the ends of the cylinder.

The multiplicity of the comparatively small openings presents distributed fluid controlling friction surfaces, resisting the egress of oil through the wall of the cylinder at widely distributed points and thereby furnishes a very advantageous control over the piston throughout its movements.

It will be observed that in each of the zones c is provided a row of openings (herein four are shown on each side of the cylinder) adjacent the zone b furnishing a total opening less than that in the lateral rows directly above and beneath the same. As a result when the piston is suddenly moved toward either end of the cylinder the locally reduced opening formed by said rows of four openings momentarily increases the resistance to the passage of the fluid through the cylinder and momentarily checks the piston. Rebound of the latter is prevented by the larger total opening presented by the longer row of openings directly beyond said locally reduced opening. The continued movement of the piston is then gradually retarded by the taper or gradation of the openings in the zone c.

The resistance to the egress of the oil in any or all of the zones may be varied not only by varying the sizes or areas of the perforations, but by varying their frequency of distribution, that is, if the perforations are arranged in rows, the number of perforations in the rows more remote from the central portion of the cylinder may be made less than in the rows in the central portion of the cylinder.

As the piston moves downwardly the oil beneath it passes into and through the annular chamber 11 and returns into said cylinder through the perforations above the piston. Similarly when the piston moves upwardly the oil above the piston is forced from the cylinder into the annular chamber and into the cylinder beneath the piston. Thus the device not only cushions or absorbs downward shocks but also prevents any sudden recoil. It will be understood that the oil always fills the annular chamber and cylinder but that its circulation will depend upon the movement of the piston within the cylinder and the freedom with which the oil is permitted to pass from the cylinder into the annular chamber. To permit the oil to pass beneath the piston beyond the limit of the perforations in the zones c and to vary the pressure of the oil or fluid within the casing and cylinder the upper and lower cylinder heads may be each provided with ports 37 communicating with the cylinder and the annular chamber, the opening of said ports being regulated by adjusting screws 38.

To provide a shock absorber which may be adaptable to heavy or light vehicles and which may be readily adjustable to vary the resistance to the circulation of the oil to meet varying conditions as required, the effective areas of the perforations in the zones referred to may be varied. To this end the zones a, b, c, are provided with adjusting rings a', b', c' respectively, which encircle the cylinder 9 opposite to their respective zones and may be provided with perforations corresponding to the perforations in the cylinder zones. It will be obvious that by turning said rings about said cylinder their perforations may be brought in accurate registration with the perforations in said cylinder or said rings may be turned to destroy the exact registration of said perforations to a greater or less extent as desired. Herein the adjusting rings may be turned into four positions of adjustment and may be held in these positions by a pair of screws 39 threaded into each of said rings at opposed points, said screws being adapted to be set into the threaded holes 41 to give the adjustment desired. As shown in Fig. 2, the cylinder is provided with four perforations on each side, corresponding to seven perforations on opposite sides of the ring thereof. The screw holes 41 in said cylinder are not spaced at even distances apart but herein the screw holes $41^a$, $41^b$ are one-fourth of an inch apart; the screw holes $41^b$, $41^c$ are nine thirty-seconds of an inch apart; and the screw holes $41^c$, $41^d$ are five-sixteenths of an inch apart. As a result by turning a ring about the cylinder 9 to bring the screws 39 in registration with the various screw holes $41^a$, $41^b$, $41^c$ and $41^d$ the cylinder perforations may be cut off more or less to vary the freedom of fluid flow therethrough as desired. By the use of a separate ring for each zone the effective areas of the perforations in the various zones may be independently adjusted.

To permit the adjustment of the rings the cylinder 9 may be removed from the casing 3 by simply unscrewing one of the cylinder heads which will permit the ready withdrawal of the cylinder therefrom. The rings may then be adjusted to give the area of perforation desired and the cylinder returned within the casing and the cylinder head threaded thereon to hold the cylinder in place.

By my invention is provided a shock absorber which has no valves, springs or other parts which will be liable to work loose or get out of order.

The device may be readily applied to heavy or light vehicles and adjusted to respond to any loads as desired and does not interfere with the free play of the springs under normal conditions but easily and effectively responds and absorbs shocks or jars caused by abnormal conditions.

It will be understood that the invention is not limited to the particular embodiment shown herein but that various modifications may be made without departing from the spirit and scope of the invention.

Claims.

1. A shock absorber comprising, in combination, a fluid containing chamber having a plurality of zones, each containing a plurality of openings distributed laterally of said chamber and graded longitudinally of the latter; and means movable in said chamber and controlled by the resistance offered by said openings to the passage of said fluid therethrough.

2. A shock absorber comprising, in combination, a fluid containing chamber having a multiplicity of comparatively small openings distributed laterally of said chamber and graded longitudinally of the latter to present distributed fluid controlling friction surfaces of substantial total extent, and means reciprocable in said chamber against the resistance offered by said openings to the passage of said fluid therethrough.

3. A shock absorber comprising, in combination, a fluid containing chamber having comparatively small openings distributed laterally of said chamber and graded longitudinally of the latter toward the ends thereof to present distributed fluid controlling friction surfaces of substantial total extent, and means reciprocable in said chamber against the resistance offered by said openings to the passage of said fluid therethrough.

4. A shock absorber comprising, in combination, fluid containing chambers having a wall between them containing comparatively small openings providing communication between said chambers, said openings being distributed laterally of said wall and graded longitudinally of the latter to present distributed fluid controlling friction surfaces of substantial extent; and means reciprocable in one of said chambers against the resistance offered by said openings to the passage of fluid to and from said chambers.

5. A shock absorber comprising, in combination, a fluid containing chamber having a multiplicity of comparatively small openings distributed laterally thereof and graded longitudinally thereof, some of said openings being arranged to present a locally reduced opening area, and means reciprocable in said chamber momentarily checked by the increased resistance offered to the passage of said fluid through said locally reduced area.

6. A shock absorber comprising, in combination, fluid containing chambers having an apertured wall common thereto; means reciprocable in one of said chambers against the resistance offered to the passage of fluid through said wall, and a plurality of rings on one of said chambers for adjusting the effective areas of the apertures in said wall.

7. A shock absorber comprising, in combination, a fluid-containing chamber provided with a wall having apertured zones, means independently to adjust the apertured areas of the different zones, and means reciprocable in said chamber against the resistance offered by said apertured zones to the passage of said fluid therethrough.

In testimony whereof, I have signed my name to this specification, in the presence of two subscribing witnesses.

DWIGHT F. KILGOUR.

Witnesses:
EVERETT S. EMERY,
ROBERT H. KAMMLER.